Figure 1:
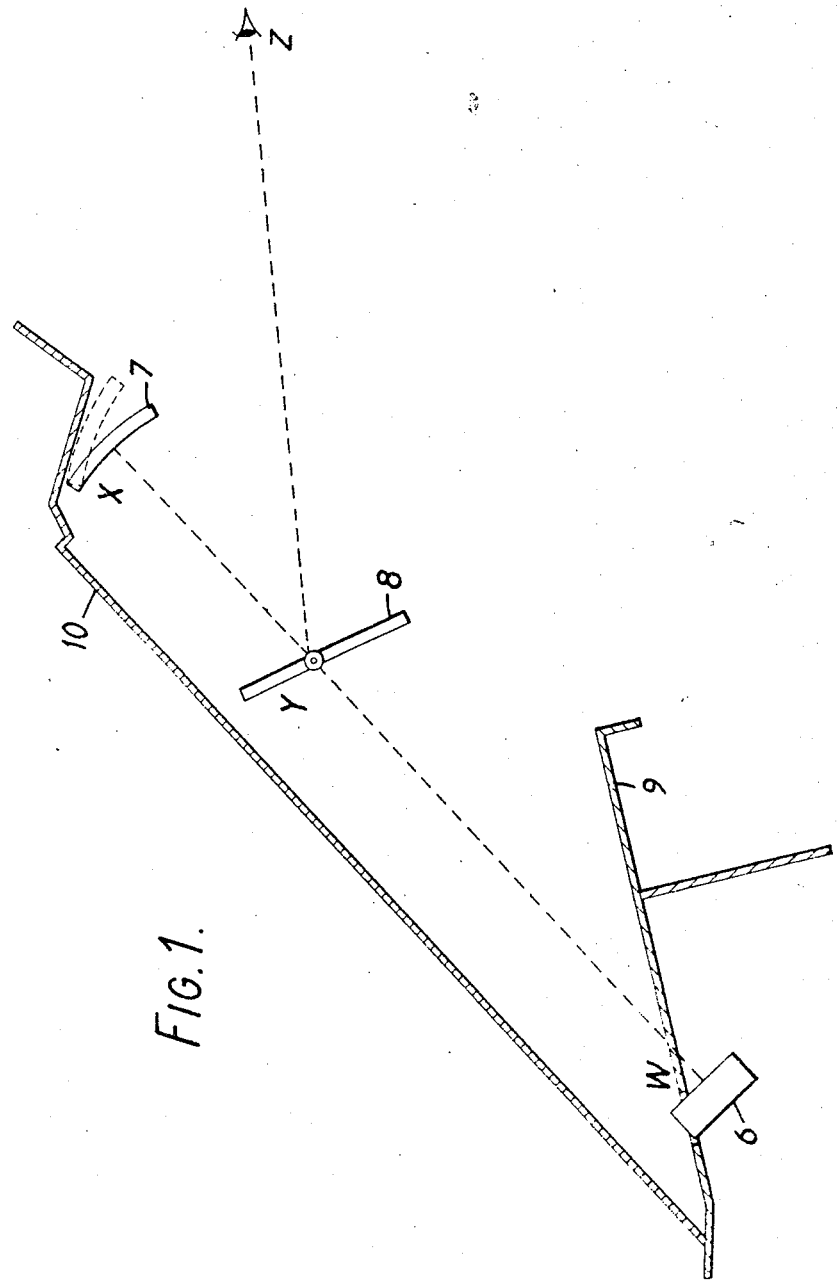

United States Patent
Jones et al.

[15] 3,663,112
[45] May 16, 1972

[54] HEAD-UP DISPLAY SYSTEM INCLUDING A CONCAVE REFLECTOR AND A MOVABLE COMBINING MIRROR

[72] Inventors: Patrick Ludlow Fleming Jones, Windsor; Robert Watson, Sandhurst, both of England

[73] Assignee: Sperry Rand Limited, London, England

[22] Filed: Aug. 10, 1970

[21] Appl. No.: 62,396

[30] Foreign Application Priority Data

Aug. 21, 1969 Great Britain......................41,664/69

[52] U.S. Cl..............................................356/251, 350/174
[51] Int. Cl. .........................................................G02b 23/10
[58] Field of Search...........................350/174; 356/251, 248

[56] References Cited

UNITED STATES PATENTS

| | | | |
|---|---|---|---|
| 2,358,316 | 9/1944 | Chwalow | 356/251 |
| 2,953,960 | 9/1960 | Robbins | 356/248 |
| 3,128,623 | 4/1964 | Gold | 350/174 |

Primary Examiner—Ronald L. Wibert
Assistant Examiner—Orville B. Chew, II
Attorney—S. C. Yeaton

[57] ABSTRACT

An optical "head-up" display system for use in aircraft comprises an information display formed by an illuminated fiber optic bundle in a graticule box mounted below the windscreen of the aircraft. An optical projection system comprising a spherical mirror mounted above the windscreen and a semi-reflecting mirror reflect the display to be seen by the pilot superimposed on his view through the windscreen. The display is stabilized in roll by rotating the graticule, and is stabilized in pitch either by moving the semi-reflecting mirror or by movi the relevant part of the graticule.

3 Claims, 6 Drawing Figures

INVENTORS
PATRICK L. F. JONES
ROBERT WATSON

HEAD-UP DISPLAY SYSTEM INCLUDING A CONCAVE REFLECTOR AND A MOVABLE COMBINING MIRROR

This invention relates to information display systems wherein an optical image of information is projected into the field of view of a user. Such systems are used in aircraft and termed "head-up displays". The optical image is caused to appear at infinity through the windscreen so that the pilot can view his surroundings and the information together without dropping his eyes to the instrument panel.

This invention is concerned with an improved optical information display system of this kind.

The invention provides an optical information display system for mounting in an aircraft comprising an illuminated source of information including at least a representation referenced to the horizon for mounting below the windscreen of the aircraft, a spherical mirror for mounting near the top or above the windscreen with its focal surface at said source, and a semi-reflecting mirror for mounting in front of said windscreen in the normal field of view of the pilot or other user and in the path of light rays reflected from said spherical mirror at an angle to the optical axis joining said source and spherical mirror such as to reflect light rays to be viewed by the user; and means for stabilizing the information display seen by the user in pitch and roll, said stabilizing means including means for adjusting the position of said source of information.

Said means for adjusting the position of said source of information may comprise means for rotating said source about said optical axis to stabilize the display in roll.

Said source of information preferably includes a glide path symbol, adjustable by the user to positions below the position of the horizon (e.g. 2° to 4° below the horizon). In addition, a horizon symbol overlying the real world horizon may be included. Flight path vectors and/or air speed indicators may also be included.

Said source of information may include illumination by an optical fiber system.

Figure 2:
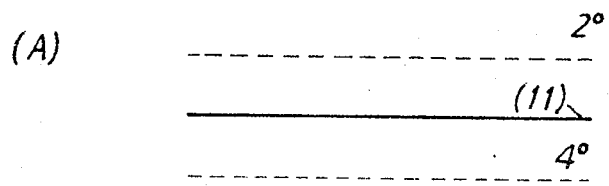
Figure 2:
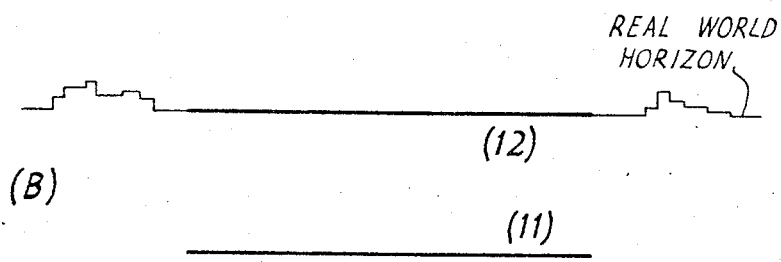
Figure 2:
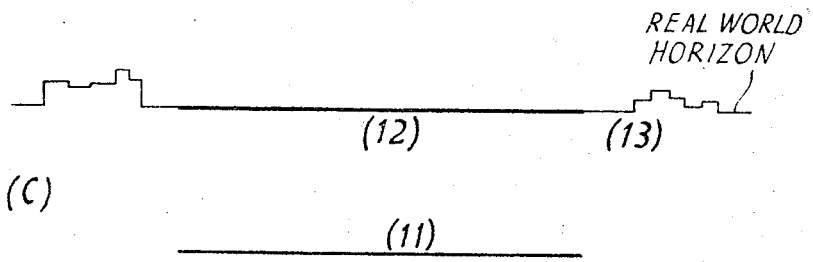
Figure 3A:
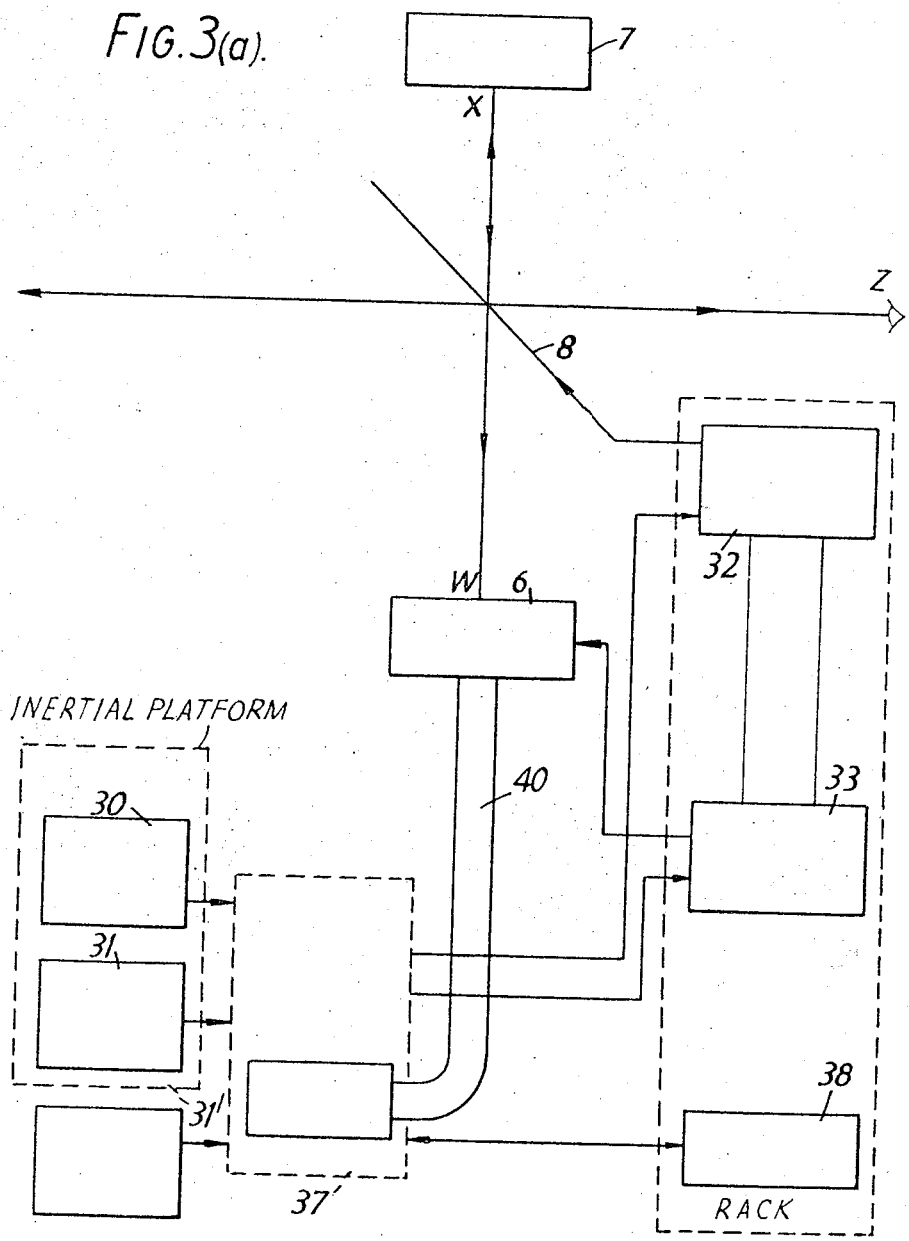
Figure 3B:
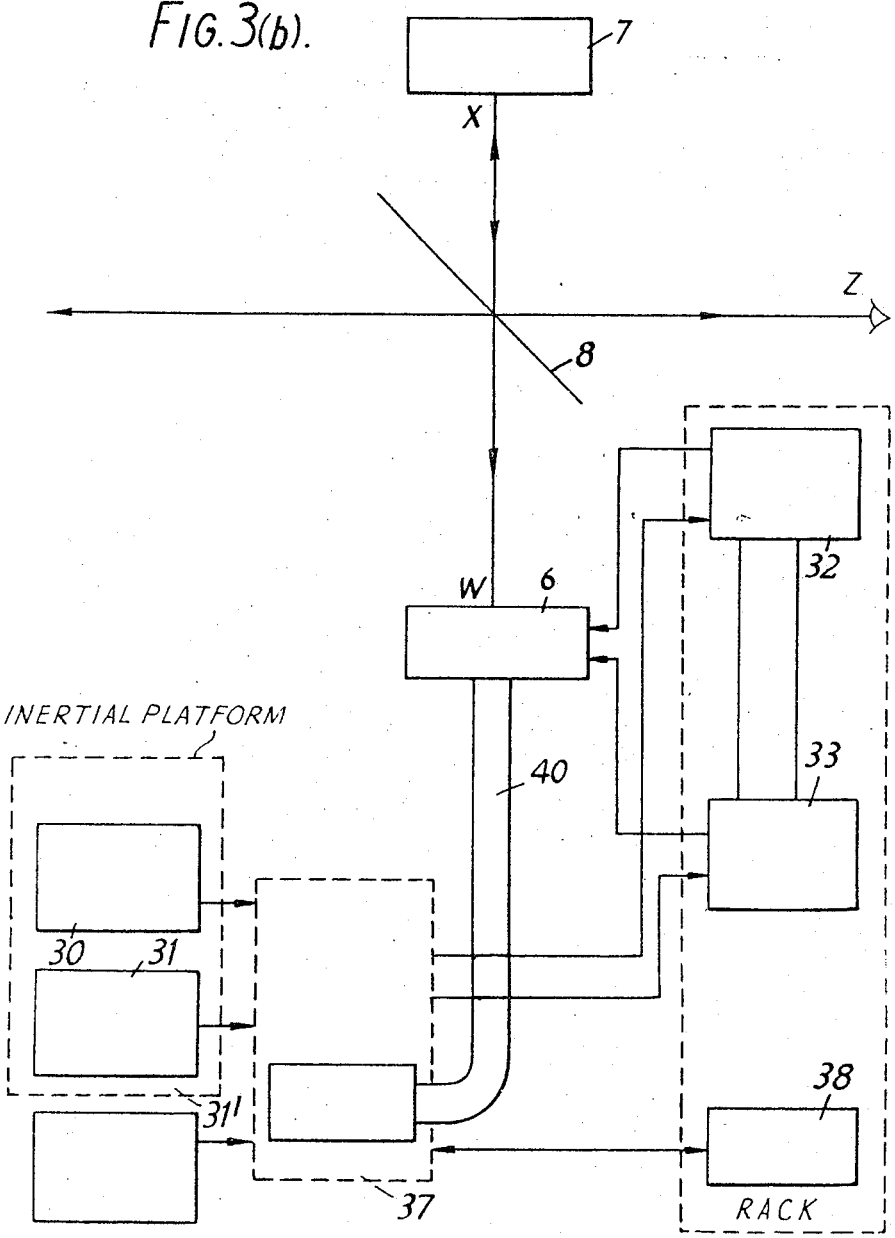
Figure 3C:
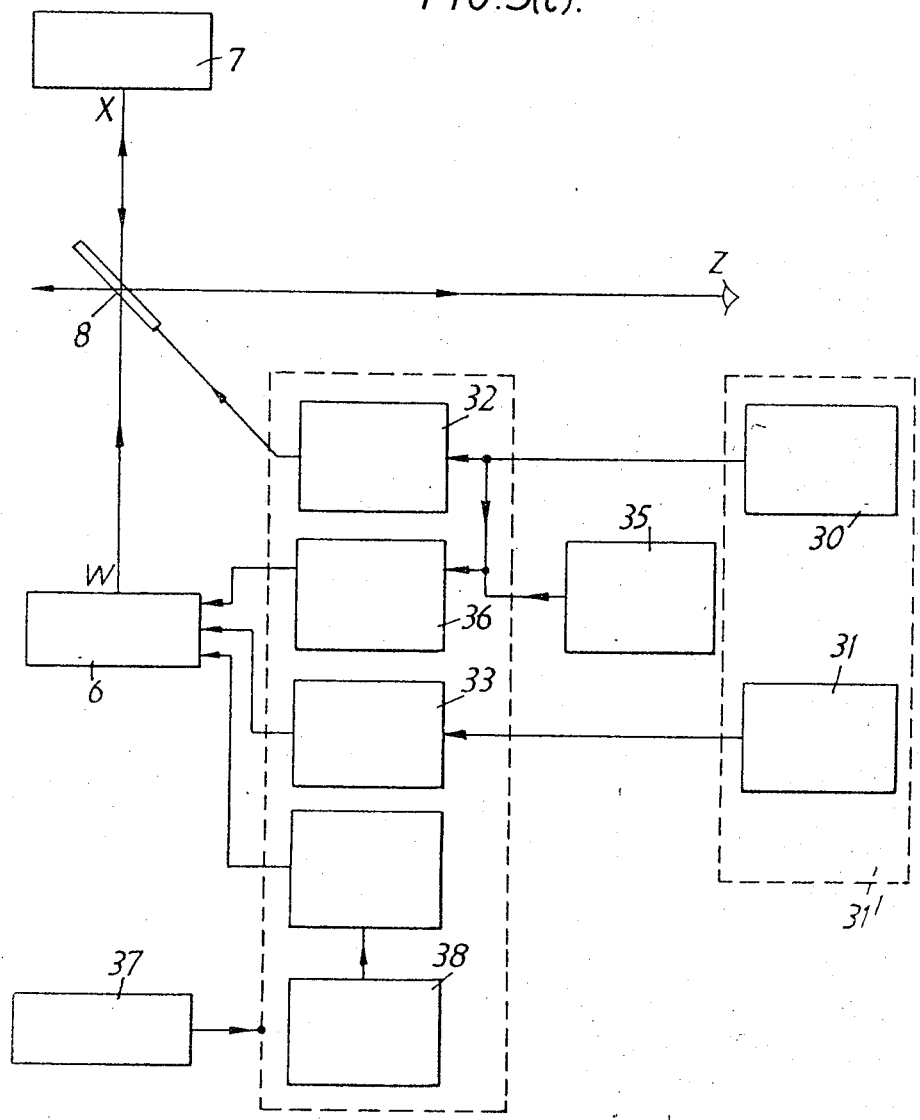
Figure 4:
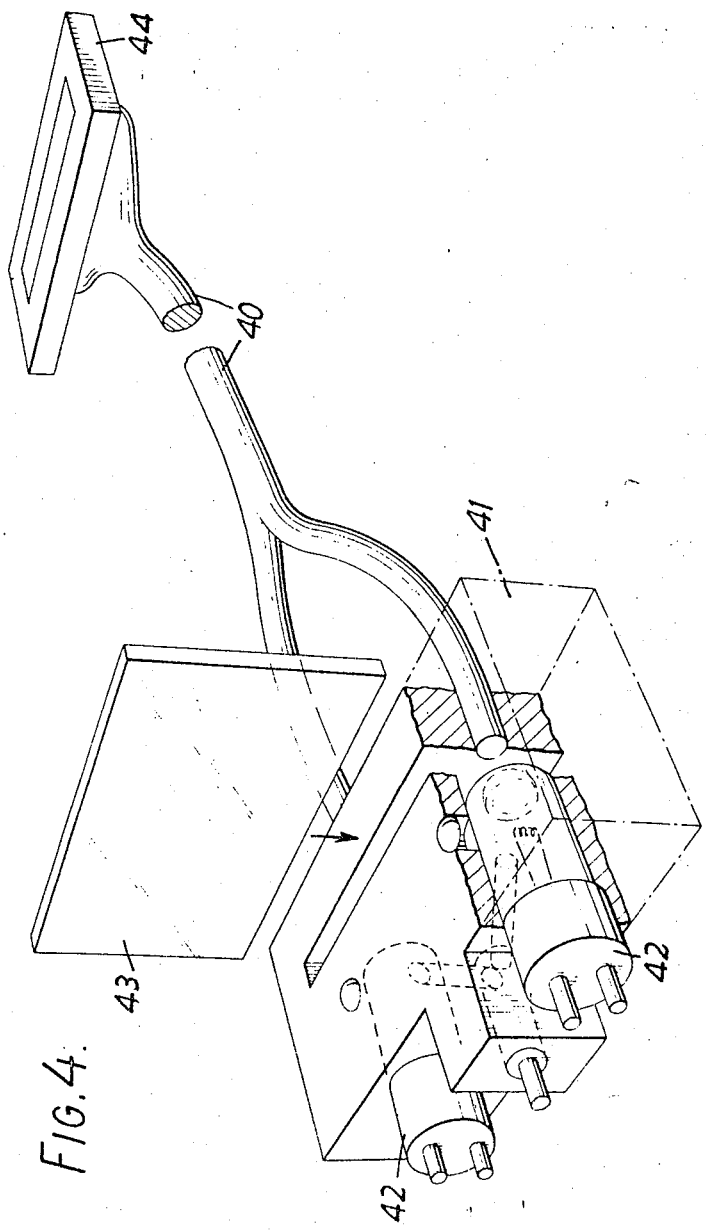

Specific embodiments of the invention are shown in the accompanying drawings, in which:

FIG. 1 is a schematic representation of an optical system for displaying information, FIG. 2 shows three variations of information displayed by the system of FIG. 1, FIGS. 3a, 3b and 3c show block diagrams of different systems for producing the display, and FIG. 4 shows a preferred form of the source of the information.

As seen in FIG. 2, the information to be displayed to the pilot is basically glide path information shown by a horizontal glide path line 11 which is stabilized in pitch and roll. The line is nominally 3° below the horizon but may be manually set to other angles. The length of the symbol line is such that it subtends an angle of about 4° at the position of the pilot's eye. A horizon symbol line 12 as shown in FIG. 2b may be added in some applications, and a flight path vector 13 as shown in FIG. 2c. In order to allow room for the movement of the vector 13 in FIG. 2c the horizon line 12 and glide path line 11 are shortened.

In straight and level flight the flight path vector 13 is co-linear with the horizon line 12 as shown in FIG. 2c so as to form an effectively unbroken horizontal line. When the aircraft is descending on the nominal 3° glide path the flight path vector 13 is brought co-linear with the glide path line 11 so as to form a substantially unbroken horizontal line nominally 3° below the horizon line 12.

The information display appears in a combining mirror 8 (FIG. 1) in the view of the pilot so that the pilot may look through the mirror to view the real world.

The information lines 11, 12, 13 are initially formed in a graticule box 6 (FIGS. 1,3 and 4). The box (as shown in FIG. 4) preferably contains optical fibers shaped and positioned so as to form luminous lines, the pilot viewing the images, formed at infinity by the optical system described hereinafter.

A bundle of fiber optics 40 has one end entered into a light source 41 containing lamps 42, so that light impinges on the fibers and travels down them. A filter 43 may be inserted in the path of light to reduce its intensity at night. The other end of the bundle 40 is fanned out to a rectangular shape in the box 6 adjacent a graticule 44 having slots therein corresponding to the information line 11, and lines 12 and 13 when these are included. The graticule may have independently moved parts forming the lines 11, 12, 13 so that these may be independently adjusted in pitch as described hereinafter.

The graticule box 6 as shown in FIG. 1 is mounted in the aircraft cockpit within the glare shield 9 so that it is not directly viewed by the pilot's eye Z. An opening (not shown) in the glare shield permits light from the illuminated lines to pass upwards along optical path W-X to pass through the combining mirror 8 and encounter a spherical collimating mirror 7, the focal surface of which coincides with the plane of the luminous lines in the graticule box 6. The collimating mirror is located in the vicinity of the sill above the windshield 10 (FIG. 1). It is about 4 inches square and of approximately 24 inches focal length in this example. The concave surface is coated with vacuum-deposited aluminum protected with a layer of silicon monoxide. As shown in FIG. 1, the mirror is hinged at its forward end and can be folded to the stowed position shown in dotted lines when not in use.

The light rays are reflected and collimated by mirror 7 and then re-encounter the combining mirror 8. Mirror 8 is mounted at an angle to the light rays such as to reflect them along optical path Y-Z whereby they are viewed by the pilot's eye Z. The pilot therefore views a virtual image of the luminous lines at infinity. The combining mirror 8 is coated on one side with a 75 percent transmitting, 25 percent reflecting neutral titanium dioxide layer and on the reverse side is bloomed to avoid spurious reflections. Since it is relatively highly transmitting the pilot can see through the mirror to view the real world through the windshield, the optically-formed virtual images appearing superimposed on his view.

In order to stabilize the information display in roll, the graticule box 6 is rotatable bodily about the optical axis W-X which passes through the center of curvature of the collimating mirror 7. Roll angles of adequate magnitude for the aircraft in which the system is fitted are provided for. In order to stabilize the information display in pitch in one arrangement the combining mirror 8 is mounted on a trunnion pitch axis (not shown) and is servo controlled so as to respond to changes in the pitch attitude of the aircraft to maintain line 11 on the selected position below the horizon and, if displayed, line 12 to overlie the true horizon.

Referring now to FIG. 3c, the control system for use in the FIGS. 1 and 2c arrangement for positioning the combining mirror and graticules is shown. Signals representing the pitch and roll attitudes of the aircraft are taken from sensors 30, 31 (FIG. 3c) of an inertial platform 31' of the aircraft. If the aircraft has no inertial platform these signals may be taken from vertical and horizon gyros of the requisite quality.

The pitch attitude signal is applied to a pitch attitude stabilizer 32 which includes the servo motor controlling the pitch angle of mirror 8. The roll attitude sensor signal is applied to a roll stabilizer 33 which includes a servo motor controlling the angle of graticule box 6 about axis W-X.

The illuminated line in graticule box 6 which forms the short line 13 is mounted so as to provide movement relative to the horizon and adjustable glide path line. In the last 0.25° of movement in both directions the flight path vector line changes to color red to indicate that the vector has reached its stop and is no longer reliable.

A signal representing the flight path angle (line 13) relative to the horizon is computed at 36 by subtracting the pitch attitude angle derived from sensor 30 from an angle of attack signal derived from sensor 35. A servo motor (not shown) controlling the carriage for the graticule part forming the flight path vector symbol is operated by the said signal.

The pilot controls operation of the system through a pilot's controller 37. This has a control operating an automatic contrast control box 38 to set the brightness level of the illuminated lines to a level decided by the pilot. The control box 38 thereafter maintains the contrast at that level. The controller also contains a day/night switch, test facilities and a self-locking glide slope selection control. Automatic switches (not shown) on the collimating mirror 7 and combining mirror 8 combine to prevent energization of the system unless both mirrors are in their operating positions.

A variation of this embodiment shown in FIG. 3a has no flight path vector system.

The information display as described is relatively narrow in lateral extent since it subtends only the angle of about 4° at the pilot's eye in an approximately horizontal plane. No correction for cross-winds is made, so that the condition can arise when the aircraft is headed in a crabbed direction so much off its direction of track that the information display is not superimposed on the area toward which the aircraft is travelling, e.g. a runway. Arrangements have previously been made to attempt to widen the display to present a larger angle of view to the pilot to avoid this, but have led to difficulties due to the bulk of the equipment necessary. Tests made with the presently described narrow angle system however show that pilots can make metal extensions to the information lines into the required area with reasonable ease and this operation does not lead to unacceptable errors.

It is found that while many aircraft cockpits are too crowded by instruments for much more to be accommodated, the three parts of the optical system described above are small enough to be fitted in. By proper choice of the focal length of the spherical mirror 7, the system can be readily adapted for different cockpit sizes.

The information symbols can be colored to distinguish them from each other or from the real world background by including colored filters in the optical path.

In other embodiments the flight path vector 13 may be flight director symbol. The symbol in either case may have time derivative or integral functions of the variable applied thereto added.

The small angle of view (4°) of the specific embodiment has also been designed with particularly cramped cockpits in view. Where space allows, however, a wider angle of view can be provided.

In other arrangements the combining mirror is fixed to the spherical mirror to form a unit which can be bodily removed when not in use. In this case the combining mirror is removable mounted on a bracket giving good location to ensure that when replaced it takes up its correct optical position.

Where space is not at a premium another embodiment of the invention (FIG. 3b) allows the semi-reflecting mirror 8 to be fixed (i.e. not tilted to adjust for pitch movement). Stabilization in pitch is achieved by moving the illuminated optics forming the lines 11 and 12 together by an amount dependent on pitch angle. The servo motor which in the previously described arrangement of FIGS. 3a and 3c tilts the semi-reflecting mirror 8 is therefore replaced by another producing a linear, generally fore-and-aft movement of the illuminated lines which are mounted on movable carriages, e.g. on slides to allow this motion.

The information displayed is independent of sources outside the aircraft and can therefore be used for landing on totally uninstrumented airfields. In practice it is found that the glide slope line 11 is the most important symbol, situated nominally 3° below the horizon. During straight and level flight the pilot may well use other instruments, but when approaching an airfield the glide slope line 11 is aligned with the runway touchdown point and maintained there, indicating that the aircraft is on the right path. Accordingly in the standard form of simplified display the glide slope line 11 only is used. For airfields where other than a 3° glide path is required, the pilot selects the requisite slope between 2° and 4° the glide slope line then being automatically self locked at this setting.

We claim:

1. An optical information display apparatus for mounting in the vicinity of an aircraft windscreen to enable pilot viewing of generated visual data simultaneously with the scene observed through the windscreen, said apparatus comprising
    an optical system including indicia representative of the longitudinal flight condition of the craft for generating the visual data,
    a combining mirror located adjacent the windscreen in the normal field of view of the pilot,
    a concave mirror disposed so that its focal plane is coincident with the generated visual data for receiving the light rays thereof transmitted through the combining mirror and directing the rays back to the combining mirror to be reflected therefrom as a collimated data beam whereby the generated visual data appears to the pilot to be located at optical infinity, and
    means for rotating the combining mirror about an axis parallel to the craft pitch axis for controlling the angle of the collimated data beam directed to the pilot in accordance with the pitch attitude of the craft.

2. The apparatus of claim 1 wherein said optical system includes a fiber optic assembly for conveying light from light source means in said optical system to a reticle which produces the generated visual image in the focal plane of the concave mirror.

3. The apparatus of claim 1 wherein the concave mirror and combining mirror are each movable between stowed and operating positions and including means cooperative therewith for precluding energization of the apparatus unless both said mirrors are in the operating position.

* * * * *